UNITED STATES PATENT OFFICE.

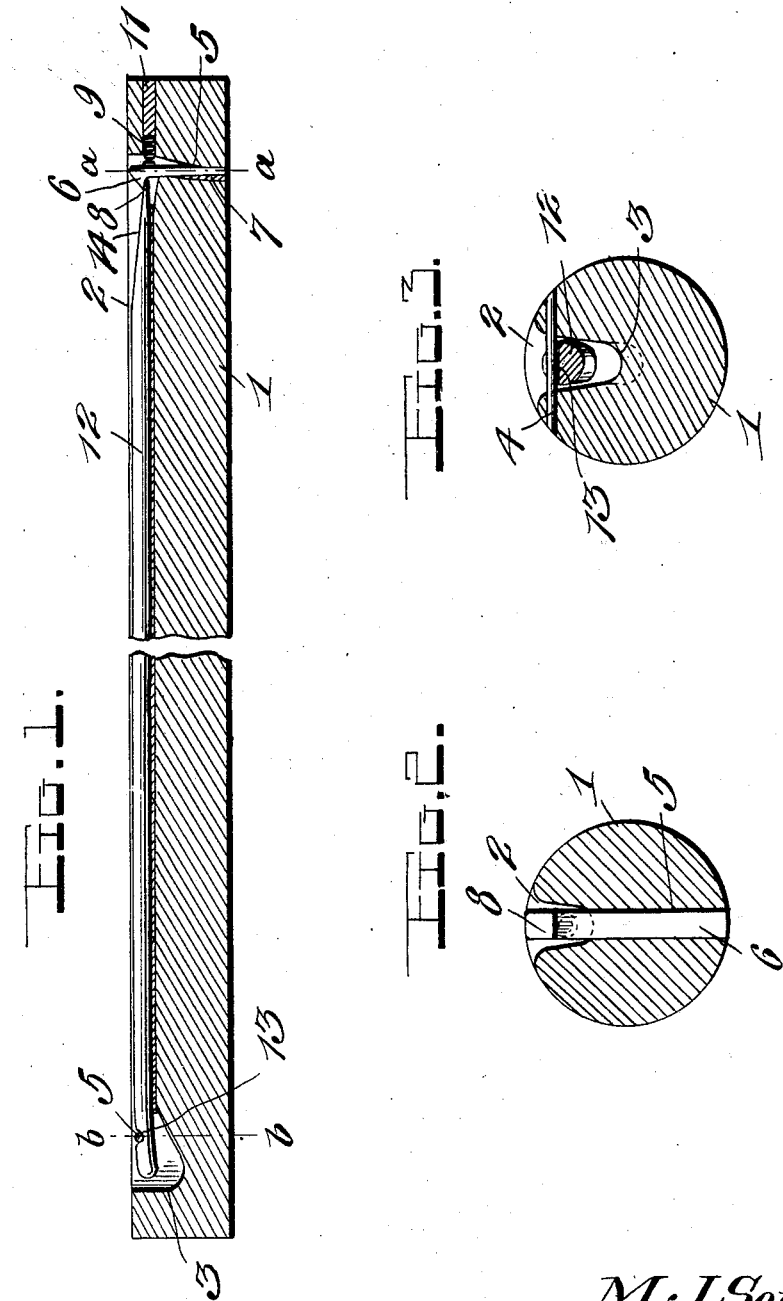

MARION J. SOWERS, OF HALLTON, PENNSYLVANIA.

CURTAIN-POLE.

1,021,902.

Specification of Letters Patent. Patented Apr. 2, 1912.

Application filed August 31, 1910. Serial No. 579,801.

*To all whom it may concern:*

Be it known that I, MARION J. SOWERS, a citizen of the United States, residing at Hallton, in the county of Elk and State of Pennsylvania, have invented certain new and useful Improvements in Curtain-Poles, of which the following is a specification, reference being had to the accompanying drawings.

This invention is an improved curtain pole, provided with means for detachably securing a curtain thereto, so that the curtain may be readily attached to, or detached from the pole at will, the said invention consisting in the construction, combination and arrangement of devices hereinafter described and claimed.

The object of my invention is to provide an improved curtain pole having means whereby a curtain may be readily attached to the pole without being stitched, and without employment of rings or other devices.

In the accompanying drawings—Figure 1 is a vertical longitudinal central sectional view of a curtain pole constructed in accordance with my invention. Fig. 2 is a transverse sectional view of the same on the plane indicated by the line *a—a* of Fig. 1. Fig. 3 is a similar view on the plane indicated by the line *b—b* of Fig. 1.

The pole 1 which is of suitable length and diameter, is, in accordance with my invention, provided in one side with a longitudinal channel 2 which extends nearly from end to end thereof, and is of suitable depth. One end of the said channel is deepened as at 3, and a cross pin 4 extends across the said channel near the deepened end thereof. A transverse opening 5 with which the pole is provided, communicates with the opposite end of the said channel. A dog or catch 6 is disposed in the said opening, and one end of the shank thereof is secured in place by means of a wedge 7. That portion of the said opening in which the movable end of the dog or catch is disposed is widened to permit the lateral movement of the dog or catch, and the latter is formed with a shoulder 8 overhanging one side thereof, and extending into the channel. A spring 9 is disposed with its inner portion in a longitudinal opening with which the pole is provided at one end. The outer portion of the said opening is closed by a plug 11. The inner end of the said spring bears against the rear side of the head of the dog or catch so as to move the latter in one direction, the shank of the dog or catch being sufficiently flexible to permit such movement of the head thereof.

A curtain locking bar 12, which may be a metallic rod of any suitable size, or may be made of any other suitable material, is disposed in the channel 2, and the end thereof which is locked at the deepened end of the channel, is notched on its outer side as at 13 and engaged with the cross pin 4. The other end of the said locking bar is flattened as at 14, and adapted for engagement by the shoulder of the dog or catch when the said bar is closed against the bottom of the channel.

When the dog or catch is disengaged from the locking bar, the latter may be opened from the pole by turning upon the pin 4 as a pivot, the deepened end of the channel affording clearance for the pivot end of the said locking bar.

In order to secure a curtain to the pole, a portion of the curtain is disposed across the channel and the locking bar is then closed against the bottom of the channel and engaged by the dog or catch so as to grip the curtain and press the same against the bottom of the channel, thereby effectually securing the curtain to the pole while permitting of its being readily detached therefrom.

I claim:—

In combination with a curtain pole, having a longitudinal channel in one side thereof and deepened at one end, said pole having a transverse opening therein, communicating with the other end of said channel, a locking bar in said channel, having one end pivotally secured in the deepened end of the channel and its opposite end beveled on its outer face, of means disposed in said channel at the end opposite the deepened end to engage the beveled face of the locking bar and hold said bar in a locked position, said means comprising a spring actuated dog having its shank portion disposed in said transverse opening, a wedge member disposed in said opening and arranged adjacent the shank portion to hold said shank rigidly within the opening, the head of said dog being inclined on its outer side and provided with a shoulder on its inner side to normally bear against the beveled end of the locking bar and locking the latter in place, and a coil spring bearing against the head of said dog to normally hold the same in a locking position.

In testimony whereof I hereunto affix my signature in the presence of two witnesses.

MARION J. SOWERS.

Witnesses:
H. C. MATTHEWS,
A. H. MATSON.